United States Patent [19]
Bournas

[11] Patent Number: 5,764,625
[45] Date of Patent: Jun. 9, 1998

[54] OPTIMAL FLOW CONTROL WINDOW SIZE DESIGN IN HIGH-SPEED NETWORKS

[75] Inventor: Redha Mohammed Bournas, Chapel Hill, N.C.

[73] Assignee: International Business Machines Corp., Armonk, N.Y.

[21] Appl. No.: 554,954

[22] Filed: Nov. 13, 1995

[51] Int. Cl.⁶ .................................. H04L 12/56
[52] U.S. Cl. ........................................ 370/231
[58] Field of Search .................... 370/229, 230, 370/231, 235, 236, 237, 389, 394, 253, 252; 395/200.02, 200.13

[56] References Cited

U.S. PATENT DOCUMENTS

| | | | |
|---|---|---|---|
| 4,736,369 | 4/1988 | Barzilai et al. | 370/231 |
| 4,769,815 | 9/1988 | Hinch et al. | 370/238 |
| 5,014,265 | 5/1991 | Hahne et al. | 370/236 |
| 5,063,562 | 11/1991 | Barzilai et al. | 370/231 |
| 5,130,986 | 7/1992 | Doshi et al. | 370/231 |
| 5,442,637 | 8/1995 | Nguyen | 370/452 |

*Primary Examiner*—Chau Nguyen
*Attorney, Agent, or Firm*—Jeanine S. Ray-Yarletts

[57] ABSTRACT

This invention deals with a method for transmitting data across a high-speed communicaitons network. More specifically, it deals with the method of approximating an optimal window size for transmitting information across a high-speed communications network. This optimal window size is determined as a function of the processing delay at each node of the network, the capacity of each link, the number of servers in the network and the round trip propagation delay.

4 Claims, 5 Drawing Sheets

OPTIMAL FLOW CONTROL WINDOW SIZE DESIGN IN HIGH-SPEED NETWORKS

BACKGROUND OF THE INVENTION

The problem of determining the "right" amount of data to be sent at a time, also known as window size, across communications networks has been the topic of many studies. The optimal size for the data window varies based on the number of intermediate nodes in the transmission network, the transmission medium, the processing power of each intermediate node, the type of data being sent (ie. interactive vs. isochronous data), and many other factors. The objective to arrive at the optimal window size is motivated by the need to maximize network productivity. If the optimal window size can be derived, then the network can perform at maximum efficiency.

The problem of determining the optimal window size arises in the flow control for all communications protocols. The following information will apply equally to sliding and pacing flow control mechanisms. Sliding window flow control means that only a fixed amount of data will be sent prior to an acknowledgement from the receiver, and as acknowledgements are received, additional data, up to the window size limit, is sent. An example of a protocol that uses a sliding window flow control mechanism is Transmission Control Program (TCP). Pacing window flow control allows a fixed window of data packets to be sent at any point in time. The next window is sent when the prior one has been acknowledged. Examples of protocols that apply window pacing include Systems Network Architecture (SNA) and Advanced Peer to Peer Networking (APPN). The goal of this invention is to determine a window size that maximizes the network efficiency depending on the performance characteristics of the sender, the receiver, and the network connecting them, thereby maximizing the network power. The network power, as used here, is defined as the ratio of the average session throughput to the average packet transmission delay.

The design of a solution to the problem at hand has been studied by many authors, one example being Keng-Tai Ko and Satish K. Tripathi in "Optimal End-to-End Sliding Window Flow Control in High-Speed Networks", IEEE Annual Phoenix Conference, 1991, pp. 601–607. The above-mentioned authors made assumptions on the inter-arrival times distribution of exogenous traffic at the intermediate packet switching nodes, and the packet service times distribution at all the nodes. The primary assumptions made were that the arrival distribution for the traffic into the network is Poisson and that the service time for packets at each node are exponential. Based on these assumptions, the optimal window size design becomes mathematically tractable, although still difficult to analyze. However, due to the emergence of high-speed networks and multimedia applications, the above assumptions no longer work. This is because multimedia applications generate bursty traffic (which is no longer Poisson in its distribution), and high-speed networking technology is based on transmitting packets of a given equal size (called cells). These new characteristics of the traffic make the assumption of generally distributed arrivals at the intermediate packet switching nodes (which imply that the packet delay at each intermediate station is generally distributed) invalid; therefore the optimal window size design problem becomes mathematically not tractable under the previous methodology.

BRIEF DESCRIPTION OF THE INVENTION

The invention provides a means for approximating the optimal window size for transmitting information in a high-speed communications network by deriving an upper and lower bound to the optimal window size. The bounds are a function of network performance characteristics: the number of servers in the network, the round trip propagation delay for the network, and the average delay for a packet at the slowest server in the network.

The upper bound is the one of most interest since network administrators will want to know the maximum window size that can be sent and still achieve optimal power in the network. In particular, this invention allows the upper bound to be expressed as a simple function of the number of hops in the network, the round trip propagation delay, and the maximum throughput of the communication path. It is noted that the round trip propagation delay may no longer be negligible, as it was assumed to be by others who have studied this problem, due not only to the high-speed of physical network media such as fiber, but also to the implementation of very advanced and fast hardware technologies in the switching nodes. Under assumptions on the arrival and service time distributions, the authors, Ko and Tripathi, in "Optimal End-to-End Sliding Window Flow Control in High-Speed Networks", IEEE Annual Phoenix Conference, 1991, pp.601–607 derived an expression for the optimal sliding window size that incorporates the round trip propagation delay. It is shown in "Optimal End-to-End Sliding Window Flow Control in High-Speed Networks" that if this delay were too small relative to the transmission and switching stations delays, then the optimal window size reduces to the one developed in "Routing and Flow Control in Data Networks", Res.Rep.RC8353, IBM Res. Div., Yorktown Heights, N.Y. July 1980 by M. Schwartz. The upper bound of the optimal window size derived herein is under no assumptions on the arrival and service time distributions. In addition, this means of determining the optimal upper bound for window size is not restricted in its application to sliding window flow control. It is equally applicable to pacing window flow control mechanisms, a generalization that to this point has never been able to be made.

DETAILED DESCRIPTION

Figure 1:
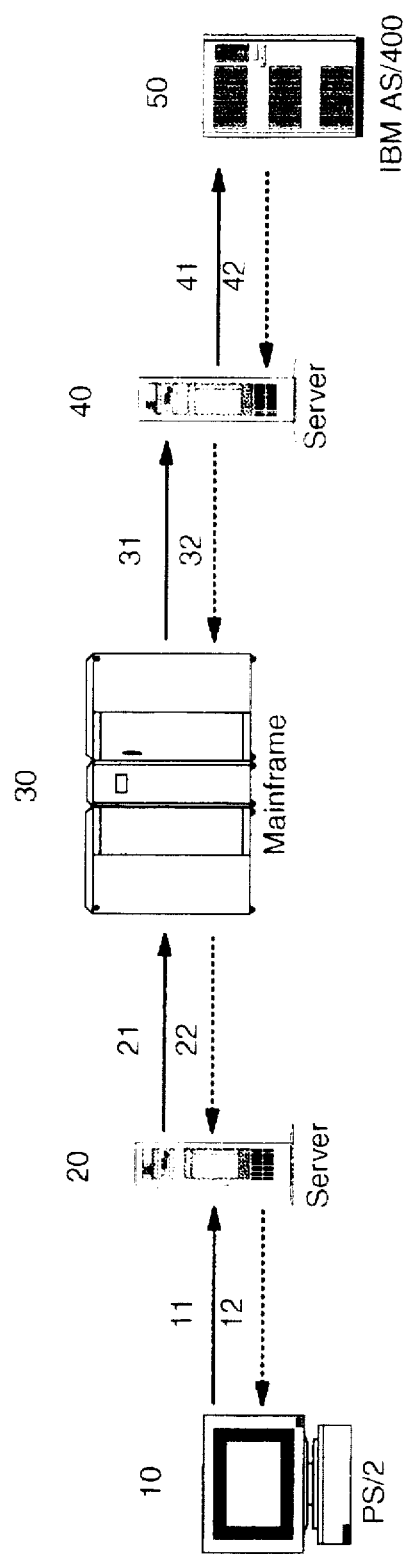
FIG. 1 shows an example of a communications network.

As demonstrated in FIG. 1, there are many different types of devices, both IBM and non-IBM, which can be contained within a communications network. The network of FIG. 1 is simplified for understanding purposes. As is known by those skilled in the art, networks typically contain many more devices than the five indicated in this diagram.

When a packet is transmitted from one device, say the PS/2 10 to another device, say the AS/400 50 in this example, the packet is passed from one node in the network to an adjacent node in the network until it reaches its destination. When the packet reaches its destination, some form of acknowledgement is transmitted in the reverse manner to the original sender. In this particular example, a packet originated at PS/2 10 is transmitted across link 11 to server 20, then it is transmitted across link 21 to mainframe 30, then across link 31 to server 40, and finally across link 41 to AS/400 50. Once the packet reaches its destination of the AS/400, if the network uses sliding window flow control, an acknowledgement is then transmitted from the AS/400 50, across link 42 to server 40, across link 32 to mainframe 30, across link 22 to server 20 and across link 12 to the PS/2 10 which originated the packet. If the system is using sliding window flow control, this acknowledgement will indicate to the PS/2 10 that it may now send additional information. If the network uses pacing window flow control mechanisms, an acknowledgement is sent only when the full window has been received.

Figure 2:
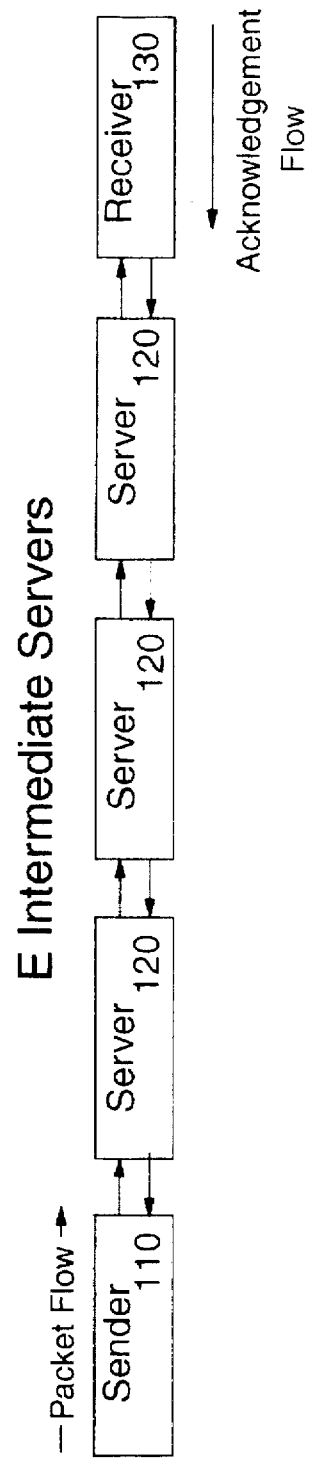
FIG. 2 is a more granular view of the flow of packets through the network.

FIG. 2 is a logical representation of the path a packet takes from the sender to the receiver. The packet leaves the sender 110, and traverses through a given number (E) of servers 120 until it reaches its destination, the receiver 130. Once it reaches the receiver 130, if the network uses sliding window flow control, an acknowledgement then traverses back through the same K servers 120 to the sender 110. If the network uses a pacing window flow control mechanism then the acknowledgement is only sent when the full window has been received.

Figure 3:
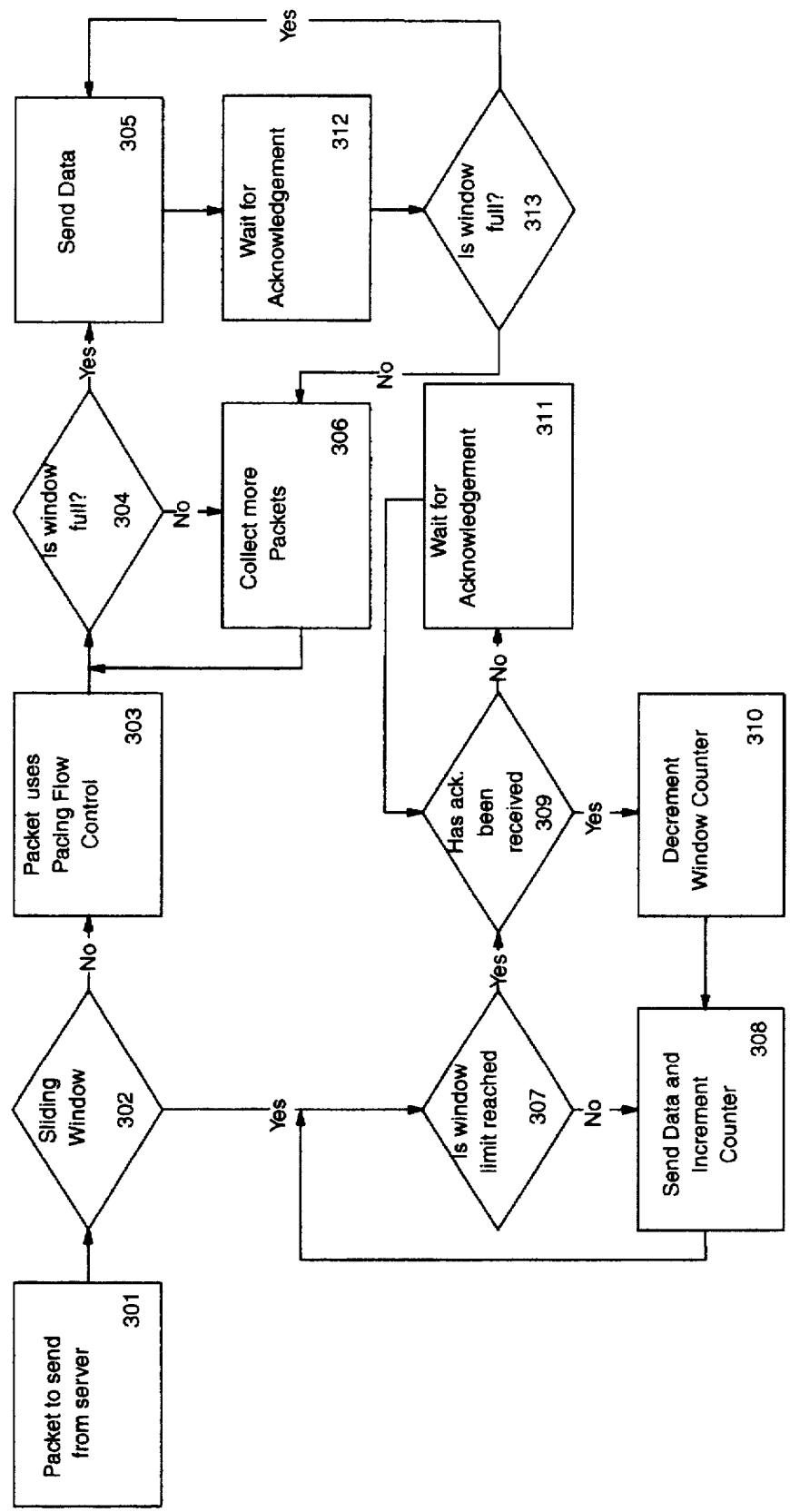
FIG. 3 is a diagram of the logic flow for packet transmission in both sliding window flow control and pacing flow control.

FIG. 3 demonstrates the logic flow for both pacing flow control and sliding window flow control. First a packet is assembled to be sent from the server 301. A check is done to determine whether sliding window flow control is used 302, if it is not, then pacing flow control must be used as noted in 303. If pacing flow control is used, then a check is made to see if the window is full 304. If it is, the server sends the data 305 and waits for the window acknowledgement 312. When the window acknowledgement is received 312, then more packets are collected 306. Upon receipt of an acknowledgement, if the window is not full as determined at 313, the server collects more packets 306 and continues to check if the window is full 304. If, when the acknowledgement was received, the window was full as in block 313, the data is again sent (returning to block 305). If the server was using sliding window flow control as determined in block 302, then the server next checks to see if the window limit is reached 307. If it has not been reached, the server sends the data and increments its window counter 308. If the window limit had been reached in 307, then a check is made to see whether an acknowledgement has been received 309. If an acknowledgement has been received, the window counter is decremented 310 and then the server continues to block 308 where the data is sent and the window counter is incremented. If an acknowledgement has not been received, the server will wait for an acknowledgement 311 prior to sending any more data.

Figure 4:
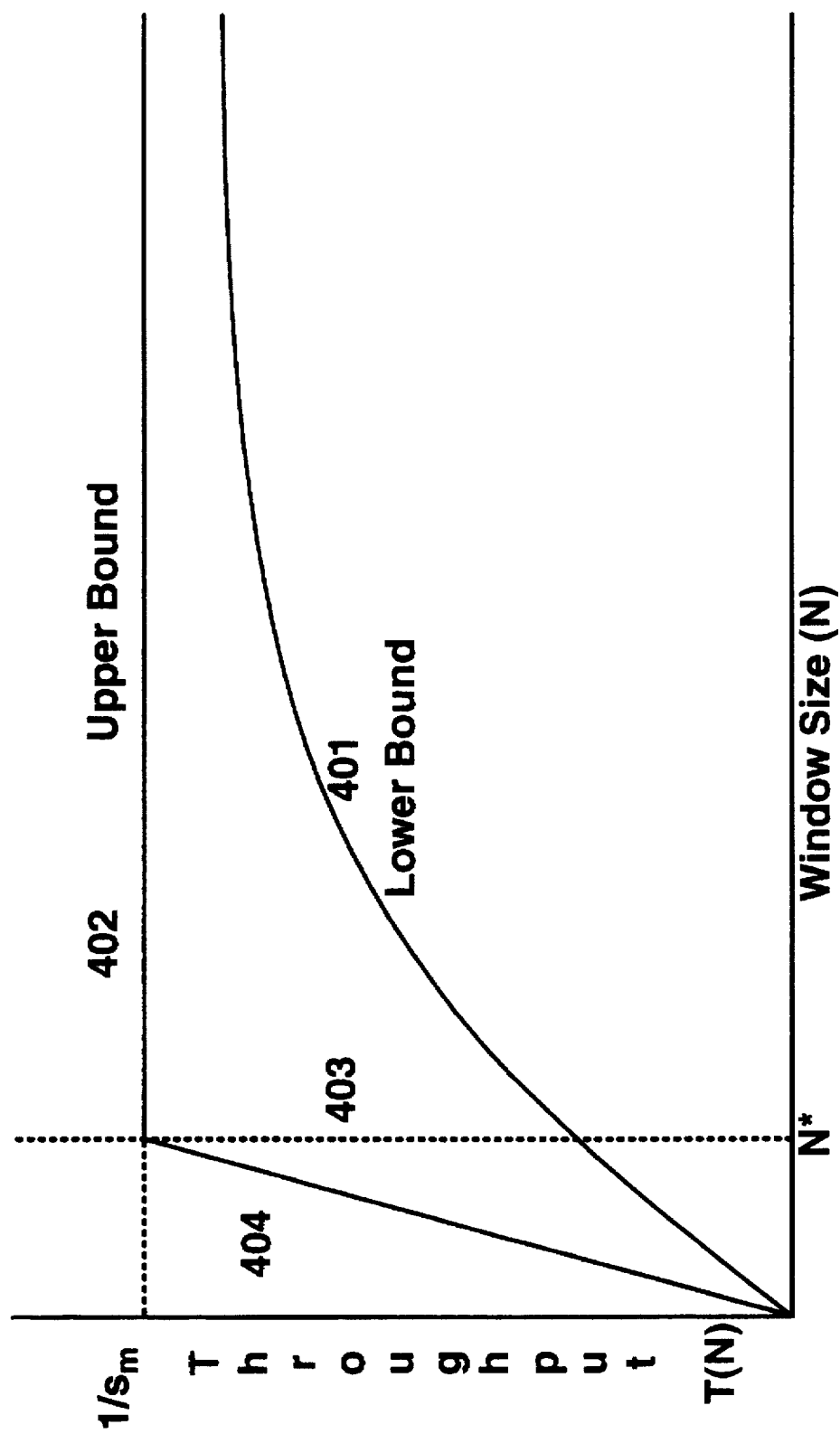
FIG. 4 represents the throughput that can be achieved in the network based on the window size being used.

FIG. 4 is a representation of the throughput T(N) of the system with respect to the window size (N) utilized in the system. Throughput is a measure of the amount of data that can be transmitted through the network per period time. Line 402 represents the upper bound for the throughput based on the window size and line 401 represents the lower bound of the throughput also based on the window size. As can be shown from the diagram, as the window size grows indefinitely large, the upper and lower bounds for the throughput converge to the same value, which is the exact average system maximum throughput. From these throughput upper and lower bounds we derive the upper and lower bounds for the optimal window size.

SLIDING WINDOW FLOW CONTROL

Consider the closed queuing system of FIG. 2 in steady-state, and let $s_i$ be the average delay (service and waiting times) of a packet at station i, m the slowest station and $M=2+2E$ the total number of logical nodes in the network. Also, let $T_p$ be the round trip propagation delay (which is modeled as an infinite server) and $N_p$ be the average number of packets in the 'wires'. By applying Little's result, which is well known in the art and more specifically discussed in "Queuing Systems, Volume 1 Theory" by Leonard Kleinrock, 1975, $\bar{N} = \lambda T$ where $\bar{N}$ is the average number of packets in the system, $\lambda$ is the average arrival rate, and T is the average system or processing time, to the average number of packets in service at each station, $\rho_i$, it can be concluded that $$\rho_i = \lambda s_i \leq 1$$

for each i=1,2, ... M, where $\lambda$ is the average throughput of the system in packets/second.

It can therefore be deduced that $\lambda \leq 1/s_m$ which is represented by 402 of FIG. 4. In addition, applying Little's result to the average number of packets at each station (in the queue and in service), say $N_i$, with $D_i$ denoting the average delay at each station, results in $N_i = \lambda D_i$ and $N_p = \lambda T_p$. Since $$N = N_p + \sum_{i=1}^{M} N_i$$

and $D_i \geq s_i$ for each i, it can be concluded that $$\lambda \leq \frac{N}{T_p + \sum_{i=1}^{M} s_i}$$

thereby deriving an upper bound represented by 404 of FIG. 4. The union of the throughput upper bounds 402 and 404 of FIG. 4 are expressed as:

$$\min \left\{ (1/s_m), \left( N / \left( \sum_{i+1}^{M} s_i + T_p \right) \right) \right\}.$$

The value of the intersection of 404 and 402 is $$N_x = \left( \sum_{i=1}^{M} s_i + T_p \right) / s_m,$$

as represented by the vertical line 403 of FIG. 4.

The lower bound for the throughput with respect to the window size is represented by 401 in FIG. 4. The goal is to derive a lower bound that converges to the upper bound for throughput as the window size grows indefinitely large. We start with the inequality $D_i \leq s_i + \eta_i s_i$ where:

$D_i$ represents the average delay of a packet at station i, $s_i$ represents the average service time of a packet at station i, and $\eta_i$ represents the average number of packets at station i as observed at an arrival instant.

The result, $\eta_i s_i$, is the maximal average total wait time due to the $\eta_i$ packets found in the queue and $s_i$ is the average service time of a packet. When using the knowledge that $s_i \leq s_m$ for all m and summing the values of i for $1 \leq i \leq M$, the total average delay, D, is derived as:

$$D \leq T_p + Ms_m + s_m \sum_{i=1}^{M} \eta_i.$$

Given that the sum of $\eta_i$ from 1 to M is less than N, where N is the total number of packets in the system, then using substitution, we arrive at:

$$D \leq (N+M)s_m + T_p.$$

Applying Little's result, we arrive at the throughput lower bound:

$$\lambda = (N/D) \geq [N/((N+M)s_m + T_p)].$$

Referring to FIG. 4, it should be noted that line 401 (the lower bound) converges to $1/s_m$ as N approaches infinity, which is exactly the limit converged upon by the upper bound.

Figure 5:
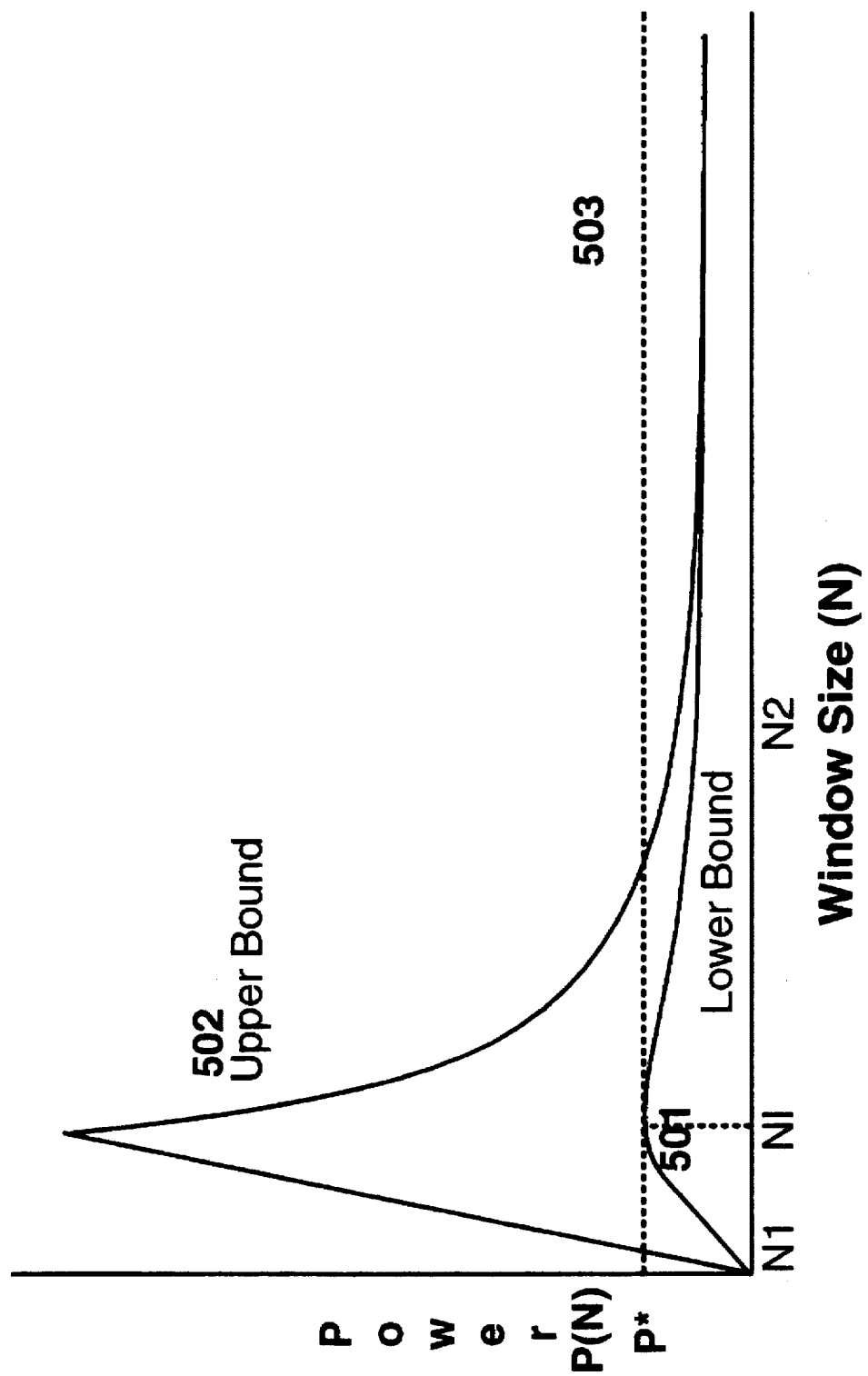
FIG. 5 illustrates the power of the network based on the window size used in the network.

FIG. 5 incorporates the network power into the equation. The maximization of network power is the criterion for optimality which was first defined by Kleinrock in "On Flow Control in Computer Networks", Proceedings of the International Conference on Communications, Vol.2, June 1978, pp. 27.2.1-27.2.5. Using the definition of power, to be $P(N) = \lambda/D = \lambda^2/N$ and utilizing the throughput upper bound derived in FIG. 4, the derived network power upper bound shown as 502 in FIG. 5 is:

$$P(N) \leq \min \left\{ \left( N / \left( \sum_{i=1}^{M} s_i + T_p \right) \right)^2, 1/Ns_m^2 \right\}.$$

Similarly, using the lower bound as depicted in FIG. 4, the lower bound for the network power is $P(N) \geq N/((N+M)s_m + T_p)^2$.

Now that we understand the curves for the upper and lower power bounds, we must continue on to determine what window size will maximize the network power, hence, be the optimal window size. Using the following terminology:

$P_l(N)$=Network power, lower bound, $P_u(N)$=Network power, upper bound, $N_l$=where $P_l(N)$ is a maximum, and $P_x = P_l(N_l)$=maximum network power lower bound value. $N_1$ and $N_2$ are determined to be the points at which the network power upper bound $P_u(N)$ equals $P_x$. Since $P(N) \geq P_x$ for all values of N, the optimal value of N cannot be less than $N_1$ or greater than $N_2$. If we determine $N_0$ to be the optimal window size, then:

$$N_1 \leq N_0 \leq N_2.$$

By differentiating $P_l(N)$ with respect to N, $N_l$ is derived, leading to $N_l = M + T_p/s_m$ and $P_x = 1/(4s_m(Ms_m + T_p))$. By solving $P_u(N) = P_x$, the lower bound for the optimal window size is determined to be:

$$N_1 = \left( \sum_{i=1}^{M} s_i + T_p \right)^2 / [4s_m(Ms_m + T_p)],$$

and the upper bound is determined to be:

$$N_2 = 4(M + T_p/s_m).$$

Note that the upper bound depends only on the service rate of the bottleneck server, the number of servers traversed and the propagation delay.

While others have studied the particular problem of sliding window flow control, there has been no study for this particular problem which merges both sliding window and pacing flow control mechanisms. Next it will be shown that the formulas derived above work equally well on pacing window flow control.

PACING WINDOW FLOW CONTROL

We now consider the case of the pacing window flow control mechanism. This control procedure is used in the path control of the SNA/APPN protocols. We let the window size be K packets, to distinguish it from the window size parameter N defined earlier. The SNA/APPN flow control mechanism works as follows. A fixed window size K is allocated for a given virtual route (logical connection between a sender and a receiver), and a pacing count PC is set at this value. This pacing count is decremented by one every time a packet enters the virtual route; i.e. PC<==PC−1. Packets are not allowed in the virtual route if the pacing count is zero. The first packet in a given window generates an acknowledgement when it arrives at the destination. This virtual route pacing response (VRPRS) is sent to the source at high priority. Upon arrival at the source, it causes the current pacing count to be incremented by the number of packets in the window; i.e. PC<==PC+K. This is the basic mechanism which does not include the algorithms for changing the virtual route pacing count upon detection of congestion at any intermediate nodes which will not be discussed in this invention.

The analysis for this flow control mechanism is more complicated than that for the sliding window flow control because the average number of packets in the virtual route is not known (this number is some function of the window size K and depends on the network performance characteristics). In what follows, we determine an upper bound for the optimal window size. Our assumptions are the same as in the sliding window flow control case; a sending station is transmitting a large volume of data to a receiving station in a burst, and there are a total of M intermediate service stations in the connection (including the sender and receiver). Let $N_{avg}$ be the average number of packets in the virtual route. We identify two types of packets: 1. the first packet in each K-block, and 2. the other ones. We assume that upon receiving an acknowledgement, the sending station has K packets ready for transmission. Let $\delta$ be the average elapsed time of a type-1 packet from the time it leaves the sending station until it is received at the destination. We will denote by $\alpha$ the elapsed time of a type-1 packet from the time its acknowledgement is prepared at the receiving station until it is received at the source node. The average elapsed time of a type-2 packet (no acknowledgement) is equal to $\delta + \beta$, where $\beta$ is the average packet delay at the slowest intermediate station. Let L be the average number of packets in the virtual route just before receiving an acknowledgement. The number of packets in the virtual route at the time a type-1 packet starts its transmission is then equal to K+L. After an average of $\delta$ units of time from the transmission of a type-1 packet, the number in the system is equal to K. If we call $\lambda$ the average throughput, then by Little's result:

$$L = \lambda \delta.$$

On the other hand, after an average of $\alpha$ units of time later (the average elapsed time of a type-1 packet acknowledgement), the average number of packets remaining in the system is equal to L. But then, by Little's result:

$$L = K - \lambda \alpha.$$

Combining the above equations, we obtain:

$$K = \lambda(\delta + \alpha).$$

Recalling that $\delta + \beta$ is the average system time of a type-2 packet, and $(\delta + \alpha)$ is the average system time of a type-1 packet, the average number of packets in the virtual route is then:

$$N_{avg} = \lambda[(K-1)(\delta+\beta)+(\delta+\alpha)]/K.$$

We first consider the case $\beta \leq \alpha$ (under this assumption, one can show that $N_{avg} \leq K$). The other case, $\beta > \alpha$, will be analyzed later. Again, the goal is to determine an upper bound for the optimal window size. At this point, let us introduce some additional notation. Let $D_{avg}$ be the average time of a packet in the virtual route, and $D$ be the average time of a type-1 packet. Then by Little's result $D_{avg} = N_{avg}/\lambda$, and using the notation of the previous paragraph, $D = \delta + \alpha$. Hence by combining the previous formulas, we obtain:

$$D_{avg} = [(\lambda D - 1)(D + \beta - \alpha) + D]/\lambda D$$

which can be rewritten as:

$$\lambda D^2 - \lambda(D_{avg} + \alpha - \beta)D + (\alpha - \beta) = 0.$$

Solving this quadratic equation leads to the following two non-negative possible solutions for D:

$$D = [\lambda(D_{avg} + \alpha - \beta) + \sqrt{\Delta}]/2\lambda,$$

or $$D = [\lambda(D_{avg} + \alpha - \beta) - \sqrt{\Delta}]/2\lambda,$$

where $$\Delta = \lambda^2(D_{avg} + \alpha - \beta)^2 - 4\lambda(\alpha - \beta).$$

Since $\alpha \geq \beta$, it follows that $\Delta \leq \lambda(D_{avg} + \alpha - \beta)$, which implies that either of the above two solutions, satisfies:

$$D \leq D_{avg} + \alpha - \beta.$$

Next, recall that the throughput upper and lower bounds are functions of the average number of packets in the virtual route, say $N_{avg}$. For the sliding window flow control mechanism, this number is exactly equal to the window size N. Hence the derived equations hold if we replaced N by $N_{avg}$. Also the network power bounds are valid if we replaced N by $N_{avg}$. Then the optimal lower and upper bounds $N_1$ and $N_2$ as defined in the sliding window flow control case apply to the optimal average number of packets in the virtual route. Let $D_{avg}^{(2)}$ be the average packet delay corresponding to $N_2$. Recall from the derivation of $N_2$ that the corresponding throughput is $1/s_m$. Hence by Little's result, $D_{avg}^{(2)} = 4s_m(M + T_p/s_m)$. The average delay for type-1 packets, say $D_2$, corresponding to $D_{avg}^{(2)}$ satisfies the inequality $D \leq D_{avg} + \alpha - \beta$ or $$D_2 \leq 4s_m(M + T_p/s_m) + \alpha - \beta.$$

Recalling that $K_x = D_2/s_m$, where $K_x$ is the optimal window size, then by the above equation:

$$K_x \leq 4(M + T_p/s_m) + (\alpha - \beta)/s_m.$$

We recall that $\beta$ is the average delay of a type-2 packet at the slowest intermediate station, and $\alpha$ is the elapsed time of a type-1 packet from the time its acknowledgement is prepared at the receiving station until it is received at the source node. By definition, then $\beta = s_m$. Also, if we assume that the propagation delay is substantially larger than the total average delay at the switching nodes because of either the implementation of the hardware and software switching logic, or the acknowledgement packets are very small in size and they have the highest processing priority at the switching nodes, then $\alpha = T_p/2$, resulting in:

$$K_x \leq 4M - 1 + (9/2)(T_p/s_m).$$

Let us now consider the case when $\beta > \alpha$. It was determined prior that $K < N_{avg}$. As we have previously discussed, the optimal value of the average number of packets in the virtual route cannot be greater than the bound $N_2 = 4(M + T_p/s_m)$. Since in this case the optimal window size cannot exceed the average number of packets in the virtual route, then it must be that:

$$K_x \leq 4(M + T_p/s_m).$$

We combine the upper bounds in the following formula:

$$K_o \leq 4(M + T_p/s_m) + \max\{0, (T_p/2s_m) - 1\}.$$

As an approximation, one could use the upper bound derived above for the design of the optimal window size. The parameters M and $T_p$ are calculated during the session establishment: $T_p$ is equal to twice the distance between the sending and receiving stations times the speed of light in the "wires". The parameter $s_m$ is however more difficult to calculate. It can be measured by the sender as the average inter-acknowledgement time between successive packets when the sender traffic is bursty. Other possibilities include obtaining the average packet processing time at each switching station from the switching stations, or to use an approximated value for the ratio $T_p/s_m$.

The above results in a method, system, apparatus and program product for controlling traffic in a high-speed network containing one or more servers where the method, system, apparatus or program product comprise the steps or means of determining the number of servers in the network, calculating a round trip propagation delay between an originating server in the network and a receiving server in the network, determining an average delay for a packet at the slowest of the servers in the network, calculating an optimal window size using the number of servers, the round trip propagation delay and the average delay for a packet at the slowest server, and transmitting data, using the calculated optimal window size, between the originating server and the receiving server in the network.

What is claimed is:

1. A method for controlling traffic in a high-speed network, containing one or more servers including an originating server and a receiving server, said method comprising the steps of:

determining the number of servers in the network;

determining a round trip propagation delay between the originating server and the receiving server;

determining an average delay for a packet at the slowest of the servers in the network;

calculating an optimal window size using the number of servers, the round trip propagation delay and the average delay for a packet at the slowest server; and transmitting data, using the calculated optimal window size, between the servers in the network wherein said optimal window size is $$4(M+T_p/s_m)+\max\{0, (T_p/2s_m)-1\} \text{ packets}$$

where M is the number of servers in the network, $T_p$ is the round trip propagation delay, ans $s_m$ is the average delay at the slowest server.

2. A high-speed communications network, comprising:

A plurality of interconnected network devices said network devices including an originating server, a receiving server and zero or more intermediate servers; and means for implementing flow control between the network devices, said flow control utilizing an optimal window size; whereby the network power is maximized, approximated by an upper bound on the window size of $$4(M+T_p/S_M)+\max\{0, (T_p/2S_M)-1\},$$

where M is the number of servers in the network, $T_p$ is the round trip propagation delay between the originating server and the receiving server, and $S_M$ is the average delay at the slowest server.

3. The system described in claim 2, wherein said optimal window size is also bounded by a lower bound, said lower bound being:

$$N_1 = \left( \sum_{i=1}^{M} s_i + T_p \right)^2 /[4s_m(Ms_m + T_p)],$$

where $s_i$ is the packet service time at server i=1,2, ... M.

4. A network node for performing network flow control in a network of interconnected servers, said network flow control comprising the steps of:

determining the number of servers in the network;

calculating a round-trip propagation delay between an originating server and a receiving server;

determining the average delay for a packet at the slowest of the servers in the network;

calculating the optimal window size using the number of servers, the round-trip propagation delay and the average delay for a packet at the slowest server; and transmitting packets of data using the optimal window size to other servers in the network, wherein:

the calculated optimal window size is $$4(M+T_p/S_M)+\max\{0, (T_p/2S_M)-1\} \text{ packets;}$$

where M is the number of servers in the network, $T_p$ is the round trip propagation delay between the originating server and the receiving server, and $S_M$ is the average delay at the slowest server.

* * * * *